United States Patent
Jansen et al.

(10) Patent No.: US 11,148,973 B2
(45) Date of Patent: Oct. 19, 2021

(54) INSULATING, REFRACTORY MOLDED BODY, ESPECIALLY PLATE, AND PROCESS FOR ITS MANUFACTURE AND ITS USAGE

(71) Applicant: Refratechnik Holding GmbH, Ismaning (DE)

(72) Inventors: Helge Jansen, Düsseldorf (DE); Thomas Schemmel, Meerbusch (DE); Petra Stein, Göttingen (DE); Michael Schölwer, Velbert (DE)

(73) Assignee: Refratechnik Holding GmbH, Ismaning (DE)

( * ) Notice: Subject to any disclaimer, the term of this patent is extended or adjusted under 35 U.S.C. 154(b) by 178 days.

(21) Appl. No.: 16/313,629

(22) PCT Filed: Jun. 27, 2017

(86) PCT No.: PCT/EP2017/065923
§ 371 (c)(1),
(2) Date: Dec. 27, 2018

(87) PCT Pub. No.: WO2018/002098
PCT Pub. Date: Jan. 4, 2018

(65) Prior Publication Data
US 2019/0322581 A1    Oct. 24, 2019

(30) Foreign Application Priority Data
Jun. 30, 2016 (DE) ..................... 10 2016 112 042.1

(51) Int. Cl.
*C04B 18/10* (2006.01)
*C04B 28/24* (2006.01)
(Continued)

(52) U.S. Cl.
CPC ............ *C04B 18/101* (2013.01); *B22D 7/102* (2013.01); *B22D 41/02* (2013.01); *C04B 28/24* (2013.01);
(Continued)

(58) Field of Classification Search
CPC ..... C04B 18/101; C04B 28/24; C04B 14/062; C04B 2111/00431; C04B 2111/0087;
(Continued)

(56) References Cited

U.S. PATENT DOCUMENTS 3,353,975 A   11/1967   Shannon et al.
3,654,199 A    4/1972   Bourette
(Continued)

FOREIGN PATENT DOCUMENTS

CN    1594197 A    3/2005
DE    2049054 A1   4/1971
(Continued)

OTHER PUBLICATIONS

European Patent Office, Rijswijk, Netherlands, International Search Report of International Application No. PCT/EP2017/065923, dated Oct. 10, 2017, 3 pages.

*Primary Examiner* — Scott R Kastler
*Assistant Examiner* — Michael Aboagye
(74) *Attorney, Agent, or Firm* — Dickinson Wright PLLC (57) ABSTRACT

An unfired, refractory molded body (1), especially a plate, especially for thermal insulation of molten metal and/or an ingot solidifying from molten metal, that includes a binding agent matrix (2) of a set binder and aggregate grains (3) of biogenic silicic acid, preferably of rice husk ash, which are incorporated into the binding agent matrix (2), wherein the binding agent matrix (2) consists of silica gel, as well as a process for its production and its usage.

20 Claims, 6 Drawing Sheets

(51) Int. Cl.
    *B22D 7/10*     (2006.01)
    *B22D 41/02*     (2006.01)
    *C04B 111/00*     (2006.01)

(52) U.S. Cl.
    CPC ............... *C04B 2111/00887* (2013.01); *C04B 2201/20* (2013.01); *C04B 2201/30* (2013.01); *C04B 2201/50* (2013.01)

(58) Field of Classification Search
    CPC ........... C04B 2111/763; C04B 2201/30; C04B 2201/50; B22D 41/02; B22D 7/102
    USPC .................................. 266/280, 271, 283, 286
    See application file for complete search history.

(56) References Cited

U.S. PATENT DOCUMENTS

| | | | |
|---|---|---|---|
| 3,917,110 A | | 11/1975 | Kiguchi |
| 4,339,115 A | * | 7/1982 | Daussan ................ B22D 41/02 266/280 |
| 4,555,448 A | * | 11/1985 | Durham .................. C08K 3/36 428/402 |
| 4,750,717 A | * | 6/1988 | Pheasant ................ B22D 41/02 266/275 |
| 5,164,003 A | * | 11/1992 | Bosco .................... C04B 12/04 106/287.1 |
| 5,204,298 A | * | 4/1993 | Yaoi ....................... B22D 41/02 501/108 |
| 7,704,336 B2 | | 4/2010 | Noack |
| 9,914,665 B2 | * | 3/2018 | Ruckert ............ C04B 35/62695 |

FOREIGN PATENT DOCUMENTS

| | | | | |
|---|---|---|---|---|
| DE | 3020681 | A1 | 3/1981 | |
| DE | 3816715 | A1 | 11/1989 | |
| DE | 9405748 | U1 | 9/1994 | |
| DE | 19731653 | A1 | 1/1999 | |
| DE | 19728368 | C1 | 3/1999 | |
| DE | 102013000527 | A1 | 7/2014 | |
| EP | 1602425 | A1 | 12/2005 | |
| GB | 2347143 | * | 8/2000 | ........... C04B 18/101 |
| GB | 2347143 | A | 8/2000 | |
| GN | 105314999 | A | 2/2016 | |
| JP | S54117321 | A | 9/1979 | |
| RU | 2161142 | C1 | 12/2000 | |
| RU | 2410190 | A | 12/2009 | |
| WO | 2015039843 | A1 | 3/2015 | |

* cited by examiner

INSULATING, REFRACTORY MOLDED BODY, ESPECIALLY PLATE, AND PROCESS FOR ITS MANUFACTURE AND ITS USAGE

CROSS-REFERENCE TO RELATED APPLICATIONS

This application is a 35 U.S.C. § 371 national phase application of International Application No.: PCT/EP2017/065923, filed Jun. 27, 2017, which claims the benefit of priority under 35 U.S.C. § 119 to German Patent Application No.: 10 2016 112 042.1, filed Jun. 30, 2016, the contents of which are incorporated herein by reference in their entirety.

FIELD

The invention pertains to an insulating, refractory molded body, in particular a plate, preferably for thermal insulation of molten metal, particularly molten steel, with respect to the surrounding atmosphere or with respect to a metallurgical vessel, especially for the production of steel in steel mills, as well as a process for its manufacture and its usage.

BACKGROUND

The statements in this section merely provide background information related to the present disclosure and several definitions for terms used in the present disclosure and may not constitute prior art.

In metallurgy, it is typical to cover the exposed surface of molten metal, especially of molten steel, within an open metallurgical vessel with a covering agent. The covering agent forms a protective and insulating layer. On the one hand, it protects the bath of molten metal from atmospheric gases in order to prevent undesirable chemical reactions in the molten metal. On the other hand, it serves to insulate, i.e. thermally insulate with respect to the atmosphere. Thus the covering agent ensures a good surface quality.

Typically a loose bulk refractory material is used as a covering agent, particularly rice husk ash. Rice husk ash is manufactured in large quantities in many rice-producing nations. It occurs as a byproduct of the burning of rice husks (hulls). When they are burned, rice husk ash is produced, which is very chemically pure and consists up to 94-96% $SiO_2$ in amorphous form. Rice husk ash is therefore also designated as biogenic silicic acid. It has a very high melting point of approximately 1650° C. During production the volatiles are burned away, wherein however a unique microporous structure of the $SiO_2$ remains intact. An extremely low thermal conductivity as well as a low bulk weight of rice husk ash result from this structure. Due to this, rice husk ash has an excellent insulating effect, although due to its high degree of fineness it results in a high degree of dust pollution, especially when being applied to the molten metal surface, which can constitute a health hazard. This is because the fine dust particles can make their way into the human body and cause, for example, eye injuries. Therefore suction equipment must be installed, for example, which in turn results in material loss due to suction of the rice husk ash.

For this reason it is also known to use granules as a covering agent instead of pure rice husk ash. The granulate consists of granulated refractory materials which are solidified by a binding agent. For example, such granules are known from DE 10 2013 000 527 A1, DE 197 28 368 C1, and DE 197 31 653 C2.

The grains of DE 10 2013 000 527 A1 mainly contain—preferably up to 90 wt.-%—diatomaceous earth. Bentonite, water glass, or cellulose, for example, are used as binding agents. The granules can also contain polyvinylpolypyrrolidone as a binding agent. The granulate melts after some time.

The granulate from DE 197 28 368 C1 comprises grains which are produced from rice husk ash, an organic, gel-forming binding agent in quantities of 1 to 10 wt. %, as well as water in quantities from 20 to 100 wt. %.

The beads/pellets of the granulate from DE 197 31 653 C2 consist of rice husk ash, which is mixed with a surfactant and a binding agent. The surfactant can be sodium alginate, sodium salt of carboxymethyl cellulose, sodium hexametaphosphate, or mixtures of these. The binding agent can be polyvinyl alcohol, molasses, sodium hexametaphosphate, Portland cement, sodium silicate, and precipitated calcium carbonate and mixtures of these. After mixing and pressing, the pellets are dried and can be fired at a temperature of 800-1400° C.

The granules lead to a markedly reduced level of dust pollution in comparison to pure rice husk ash. They do, however, comprise a higher bulk weight and thus result in poorer insulation. Additionally, due to manufacturing costs they are markedly more expensive than pure rice husk ash in bulk.

The metallurgical vessels to be covered can be in particular a metal distributor, preferably a continuous casting distributor (tundish), a ladle, or an ingot mold for rising or falling ingot casting. In ingot casting, the liquid metal is poured into a standing form (ingot mold) and solidifies within. The ingot molds can be filled from above (falling ingot casting) as well as by a feeding system from below (rising ingot casting). After solidification the ingot mold is stripped away, i.e. pulled away from the solidified metal, and the ingot is processed further.

While the molten steel solidifies in the ingot mold, shrinkage cavities (voids) can form, especially in the ingot head. Components with relatively low melting points will be pushed ahead of the crystallization front of components with higher melting points. Due to this and to the flow of ascending gas bubbles, elements such as sulfur, phosphorus, and carbon can become concentrated in the ingot head. This results in what is called ingot segregation. Due to the aggraded slags, the result will be "collapse of the head." Therefore, the affected upper portion of the ingot must be removed before it can be processed further.

With good thermal insulation of the ingot head, the molten metal in the ingot head can remain liquid for a longer time, and solidifies more slowly. The ingot becomes dense throughout, and the section which must be removed remains relatively small. Head insulation is thus especially important in ingot casting.

In rising ingot casting during steel production, a retaining plate or a metal rod is usually first placed on the ingot mold for ingot head insulation. The retaining plate typically consists of heat-delivering materials (so-called "exothermic plate") made of mixtures of various refractory oxides with metal powder and often components containing fluoride. A bag containing casting powder is affixed to the retaining plate or the metal rod by a cord. Due to the intense heat of the molten steel, the bag burns away in a short time, so that the casting powder is distributed onto the molten steel and acts as a separating and lubricating agent between the ingot mold and the bath of molten steel. Subsequently the retaining plate or the metal rod is removed and the respective bulk is manually applied to the surface of the molten metal as covering agent. This process is very expensive and, due to the immediate proximity of the workers to the hot mold, is dangerous.

It is also known to use a ring-shaped insulating hood (so-called "casting hood") to minimize head voids in the ingot head. The insulating hood is located as a separate component on the upper end of the ingot mold or on the ingot mold head and inserted into it. In this way it isolates the ingot mold head from the molten steel in the area of the ingot head. The insulating hood can be constructed as a single-part component, or it can consist of multiple plates connected to one another. The single-part insulating hood and the plates generally consist of a thermally insulating material.

SUMMARY

An object of the present disclosure is to provide a refractory, insulating molded body, especially a refractory, insulating plate, which is to comprise a low specific weight and a high chemical purity. The molded body should be suitable especially for thermal insulation of molten metal, especially of molten steel, with respect to the surrounding atmosphere and/or with respect to a metallurgical vessel, especially within the production of steel, wherein the molded body should be able to be manufactured simply and cost effectively, should ensure good thermal insulation, and should be neither hazardous to human health nor to the environment.

A further object of the present disclosure is to provide a simple and cost effective process for the production of the molded body. This object is achieved by a molded body, preferably by a plate for thermal insulation of molten metal and/or an ingot (14) solidifying from molten metal, comprising a binding agent matrix (2) of a set binding agent and aggregate grains (3) of biogenic silicic acid, which are incorporated into the binding agent matrix (2), characterized in that the binding agent matrix (2) is comprised of silica gel.

The object is further achieved in a process for producing a molded body, characterized by the following steps:
  a) Producing of a mixture comprising the biogenic silicic acid and silica sol,
  b) Filling the mixture into a mold,
  c) Compacting of the mixture,
  d) Demolding the green molded body, and
  e) Allowing the molded body to set.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In the following, the present disclosure will be explained exemplarily in greater detail with the help of an illustration. Shown here.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

The unfired refractory molded body 1 according to the present disclosure (FIGS. 1-6) comprises a binding agent matrix 2 of at least one set binding agent, in which aggregate grains 3 of biogenic silicic acid, preferably of rice husk ash, are embedded or incorporated. The aggregate grains 3 are distributed in the binding agent matrix 2.

Figure 1:
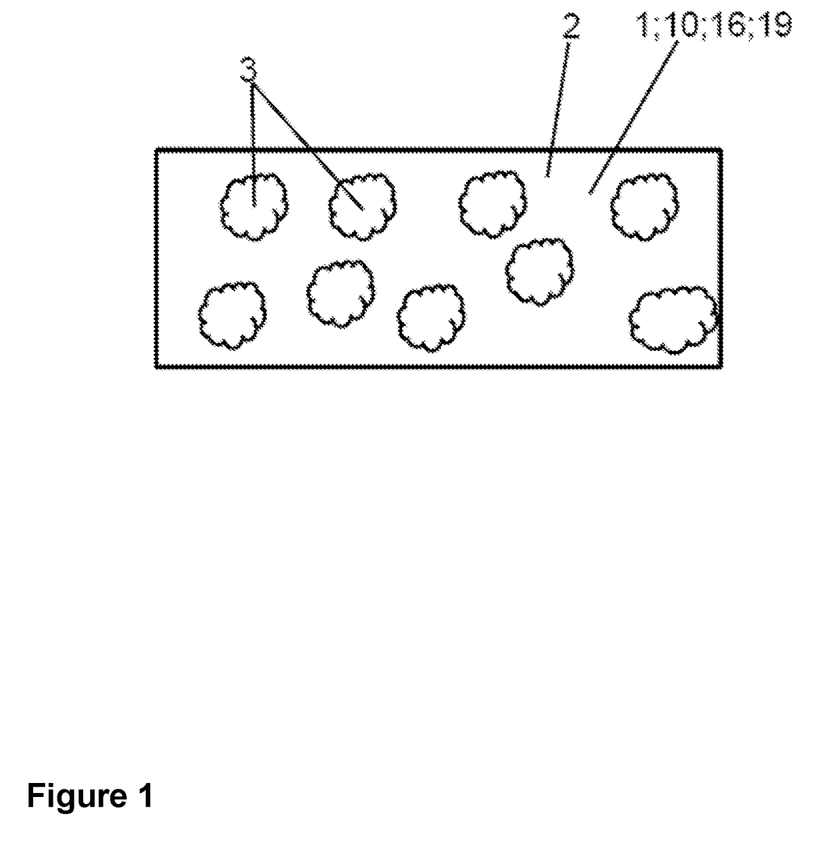
FIG. 1—schematically shows a cross-section through the molded body according to the present disclosure.

According to the present disclosure, the binding agent matrix 2 consists entirely of silica gel. Silica gel is an amorphous silicon dioxide. As a result, the binding agent matrix 2 according to the present disclosure consists of amorphous silicon dioxide. As is known, silica gel is formed from silica sol, an aqueous, solvent-free, colloidal solution of amorphous silicon dioxide, by gelling to form Si—O—Si bridges and drying.

The biogenic silicic acid is preferably exclusively rice husk ash. However, it can also be diatomaceous earth (kieselguhr) or silica shale or diagenetically fossilized radiolaria or opal sponges. Mixtures of various biogenic silicic acids can also be present as an aggregate material.

Furthermore, the molded body 1 can also comprise additional aggregate materials of refractory material. Aggregate materials in the sense of the present disclosure are in general materials whose grains are distributed in the binding agent matrix 2 and are incorporated or embedded into it. During setting, the aggregate materials do not react or only superficially react with the binding agent. The aggregate grains are therefore essentially mechanically incorporated into the binding agent matrix 2.

The additional aggregate materials therefore preferably also consist of $SiO_2$ like the biogenic silicic acid. In particular, they are microsilica, preferably pyrogenic and/or precipitated silicic acid. This has the advantage that the molded body 1 according to the present disclosure comprises a very high alkali resistance, as both the binding agent matrix 2 and the aggregate materials consist of amorphous $SiO_2$.

The molded body 1 can also contain further aggregate materials which are not solely composed of $SiO_2$. For example, the molded body can include expanded perlite and/or expanded vermiculite and/or expanded clay and/or inorganic fibers, preferably mineral and/or slag and/or glass and/or ceramic fibers, and/or fly ash and/or (power plant) filter dust as aggregate material. However, the amount of such aggregate material is preferably <20 wt. %, especially preferably <10 wt. %, in relation to the total content (dry mass) of aggregate materials.

Additionally, the aggregate of the molded body 1 consists preferably at least 50 wt. %, more preferably at least 80 wt.-%, especially preferably at least 90 wt. % of biogenic silicic acid, preferably of rice husk ash, with respect to the total content (dry mass) of aggregate materials. It is advantageous if the molded body 1 comprises exclusively biogenic silicic acid, preferably exclusively rice husk ash, as an aggregate material. The aggregate of the molded body 1 thereby consists preferably 100 wt. % of biogenic silicic acid, preferably 100 wt. % of rice husk ash.

The production of the molded body 1 according to the present disclosure takes place as follows. First, the dry components are mixed. The dry components are the biogenic silicic acid and if applicable the other additives as well as possibly amorphous silicon dioxide as a binding agent. Next, water is added to the dry mixture to moisten the silicon dioxide, so that the silicic acid is activated.

It is advantageous, however, to add the amorphous silicon dioxide already in dissolved, dispersed, or colloidally dispersed form, i.e. as silica sol, as a liquid to the dry mixture of the other components. The amorphous silicon dioxide can also be mixed with the other components partially in dry form and partially as silica sol.

The composition of the finished mixture is preferably adjusted so that the mixture comprises a slump—determined in reference to DIN EN ISO 1927-4 (03/2013)—of 200 to 500 mm, preferably 250 to 350 mm, without separation of the coarse and fine grain fractions taking place, as is the case with pure rice husk ash.

Preferably the finished mixture/the batch for production of the molded body 1 comprises the following composition of dry components in relation to the total dry mass, wherein the individual components add up to 100 wt. %:

|  | Amount [wt. %] | Preferably |
|---|---|---|
| Biogenic silicic acid, preferably rice husk ash | 40.0 to 95.0 | 65.0 to 90.0 |
| Silicon dioxide as binding agent | 5.0 to 30.0 | 10.0 to 20.0 |
| Other components | 0 to 30.0 | 0 to 15.0 |

Furthermore, the weight ratio of the liquid solvent, preferably of the water, to the dry ingredients is preferably 2:1 to 1:9, more preferably 1:1 to 3:7.

The rice husk ash used also preferably comprises the following chemical composition according to DIN EN ISO 12677 (02/2013), wherein the individual components (without ignition loss) add up to 100 wt. %:

|  | Amount [wt. %] | preferably |
|---|---|---|
| $SiO_2$ | 92 to 98 | 94 to 97 |
| $P_2O_5$ | 0.5 to 2.0 | 0.5 to 1.5 |
| $K_2O$ | 1.0 to 3.0 | 1.5 to 2.5 |
| Remaining oxides | 0.5 to 3.0 | 1.0 to 2.0 |

The biogenic silicic acid used, especially the rice husk ash, also comprises the following grain distribution according to DIN 66165-2 (04/1987) in relation to the dry mass, wherein the individual components add up to 100 wt. %:

| Grain size [mm] | Amount [wt. %] | preferably |
|---|---|---|
| ≥2.0 | 0 to 3.0 | 0.01 to 0.5 |
| <2.0-1.0 | 0.05 to 4.0 | 0.1 to 2.0 |
| <1.0-0.5 | 1.0 to 40.0 | 1.5 to 35.0 |
| <0.5-0.3 | 3.95 to 40.0 | 8.39 to 30.0 |
| <0.3 | 30.0 to 95.0 | 40.0 to 90.0 |

The bulk density of the biogenic silicic acid used, especially of the rice husk ash, according to DIN EN 1097-3 (06/1998) is preferably 0.05 to 0.5 $g/cm^3$, preferably 0.1 to 0.4 $g/cm^3$.

The finished mixture is subsequently put into a mold and compacted within it. Compaction is effected especially by superimposed load vibration or uniaxial pressing.

For superimposed load vibration, the mold is located on a vibration table. A weight is placed on the finished mixture inside the mold, the vibration table is activated, and the mixture is compacted by vibration. Smaller forms are usually produced by load vibration.

For uniaxial pressing, the mold filled with the finished mixture is placed into a press, wherein a cover plate is placed onto the mixture. Then the upper stamp of the press is pushed against the cover plate and the mixture is thus compressed with a specific pressure. Preferably, multiple pressing strokes are used. Larger forms are usually produced by uniaxial pressing.

After compaction, the green molded body is demolded and allowed to set. Setting takes place in particular at temperatures between 110 and 200° C. for preferably 4 to 12 hours. The temperature is chosen such that the binding agent sets or hardens. This range lies beneath the temperature for ceramic firing. Thus the molded body 1 according to the present disclosure is unfired.

The molded body 1 according to the present disclosure then preferably comprises a dry apparent density $\rho_0$ between 0.3 and 1.5 $g/cm^3$, more preferably between 0.5 and 1.3 $g/cm^3$ according to DIN EN 1094-4 (09/1995).

Additionally, the molded body 1 preferably has a porosity of 60 to 90%, preferably between 70 and 80% according to DIN EN 1094-4 (09/1995).

The cold compression strength of the molded body 1 preferably lies at 0.5 and 15.0 MPa, more preferably at 1.0 and 10.0 MPa according to DIN EN 993-5 (12/1998).

The cold bending strength of the molded body 1 is preferably at 0.3 and 7.0 MPa, more preferably at 0.5 and 5.0 MPa according to DIN EN 993-6 (04/1995).

The hot bending strength of the molded body 1 preferably amounts to 0.5 to 5.0 MPa, more preferably to 1.0 to 3.0 MPa according to DIN EN 993-7 (04/1995).

Additionally, the molded body 1 preferably has a softening point, determined with a hot stage microscope according to DIN EN 51730 (09/2007), between 1500 and 1700° C., preferably between 1650 and 1700° C. Therefore the molded body 1 is ideal for long-duration/permanent use at very high temperatures.

Additionally, the molded body 1 preferably has the following thermal conductivities according to DIN EN 993-15 (07/2005):

|  | Thermal Conductivity [W/mK] | Preferably |
|---|---|---|
| At 26° C. | 0.10 to 0.14 | 0.11 to 0.13 |
| At 307° C. | 0.12 to 0.16 | 0.13 to 0.15 |
| At 700° C. | 0.17 to 0.21 | 0.18 to 0.20 |
| At 995° C. | 0.25 to 0.29 | 0.26 to 0.28 |

The molded body 1 according to the present disclosure also preferably comprises the following chemical composition according to DIN EN ISO 12677 (02/2013), wherein the individual components add up to 100 wt. %:

| | Grain size [mm] Amount [wt. %] | |
|---|---|---|
| | | Preferably |
| $SiO_2$ | 93.0 to 99.0 | 95.0 to 98.0 |
| $P_2O_5$ | 0.2 to 1.5 | 0.5 to 1.3 |
| $K_2O$ | 0.3 to 2.5 | 0.5 to 2.2 |
| Remaining | 0.5 to 3.0 | 1.0 to 1.5 |

As already explained, the molded body 1 according to the present disclosure is used for thermal insulation of molten metal, especially molten steel, from the surrounding environment. The molded body 1 is preferably used for thermal ingot head insulation during rising ingot casting.

An ingot casting apparatus 4 (FIGS. 2 and 3) for rising ingot casting of metal, particularly of steel, usually comprises a sub-frame 5 with a casting channel 6 for feeding the molten metal, particularly the steel. Additionally, the ingot casting apparatus 4 comprises a tubular ingot mold 7 for receiving a bath 8 of molten metal. The ingot mold 7 comprises a lower and an upper, open, ingot mold end 7a;b. The upper ingot mold end 7b forms an ingot mold head 9 of the ingot mold 7.

Figure 2:
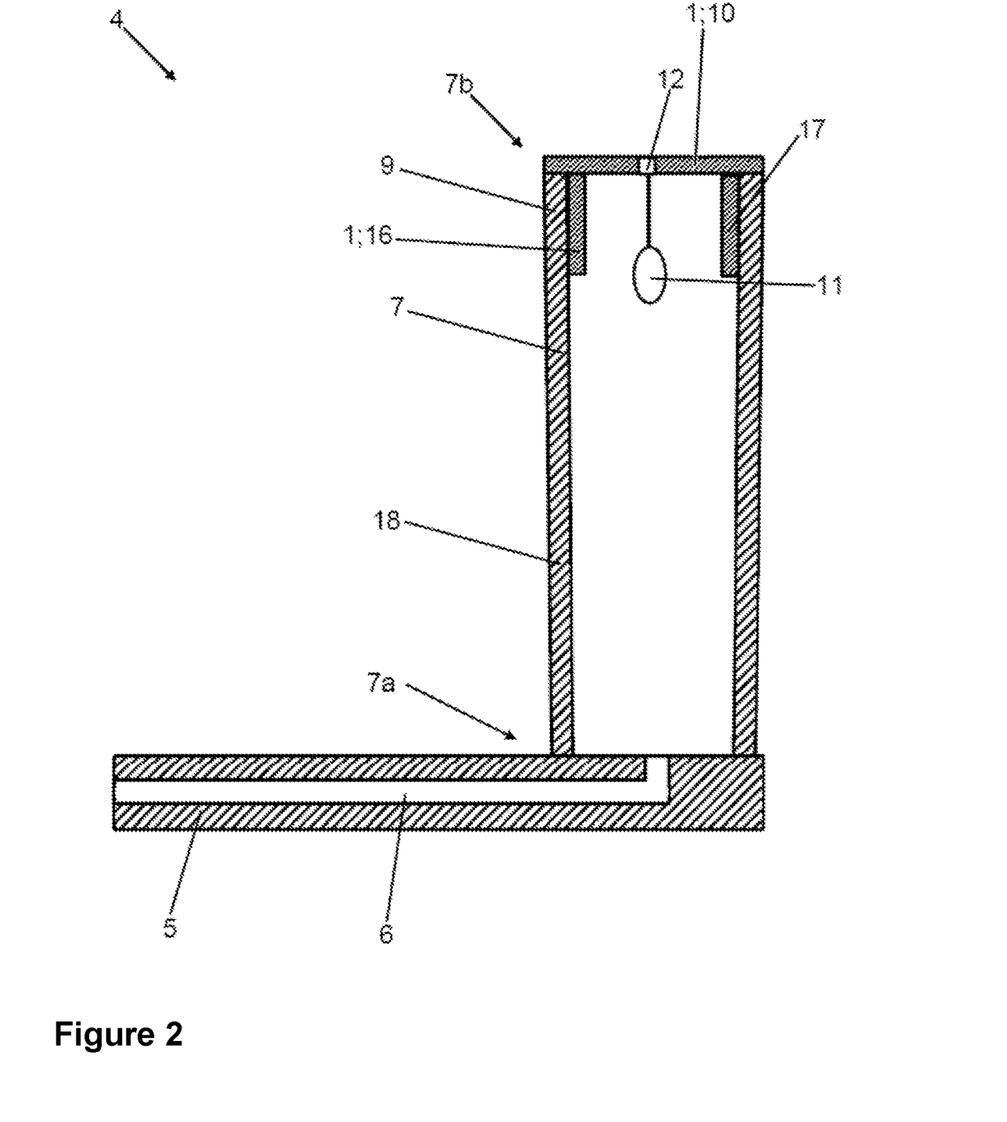
FIG. 2—schematically and in a greatly simplified manner shows an ingot mold with a cover plate for rising ingot casting before the start of the casting process.

According to one favorable aspect of the present disclosure, the molded body 1 is used as a cover plate 10 for covering the upper open ingot mold end 7b. For this purpose, the cover plate 10 is placed on the ingot mold head 9 before beginning the ingot casting (FIG. 2). The placement on the ingot mold 7 thus takes place without direct contact with the metal bath 8. The metal bath 8 is thereby indirectly, i.e. without direct contact, thermally insulated by the cover plate 10. A casting powder bag filled with casting powder is fastened on the cover plate 10 in such a way that it hangs down from the cover plate 10 inside the ingot mold 7. For fastening the casting powder bag 11, the cover plate 10 preferably comprises a central recess 12 extending from one plate surface to the other.

Figure 3:
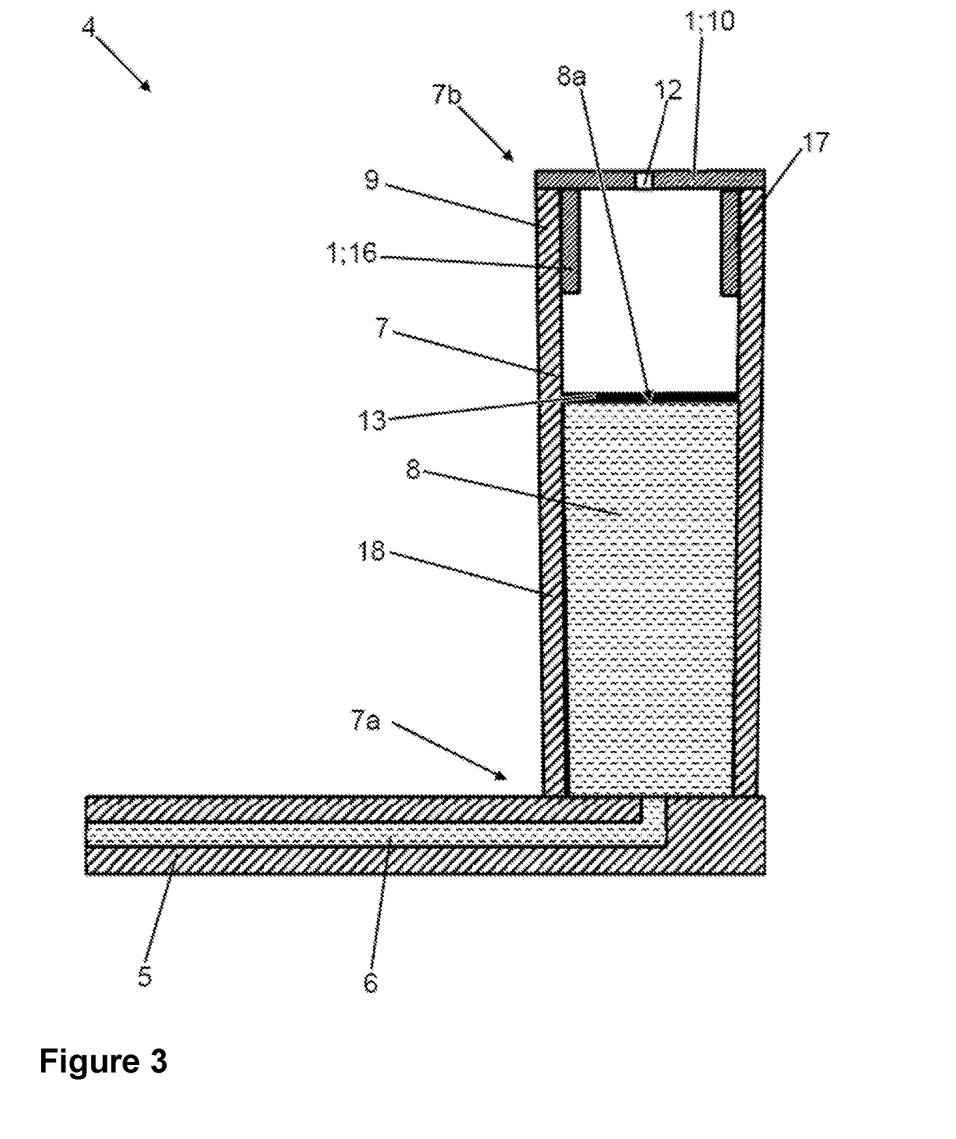
FIG. 3—shows the ingot mold according to FIG. 2 during the casting process.

At this point the molten metal, particularly the molten steel, is fed through the casting channel 6 into the ingot mold 7 from below, and rises upward within it (FIG. 3). The metal bath 8, particularly the steel bath, generally has a temperature of approximately 1550° C. Therefor the casting powder bag 11 burns away in a short time due to the intense heat of the molten steel, so that the casting powder is distributed over the surface 8a of the molten metal and forms a superficial casting powder layer 13. The casting powder is additionally distributed between the ingot mold 7 and the metal bath 8 and acts as a separating and a lubricant agent.

Figure 4:
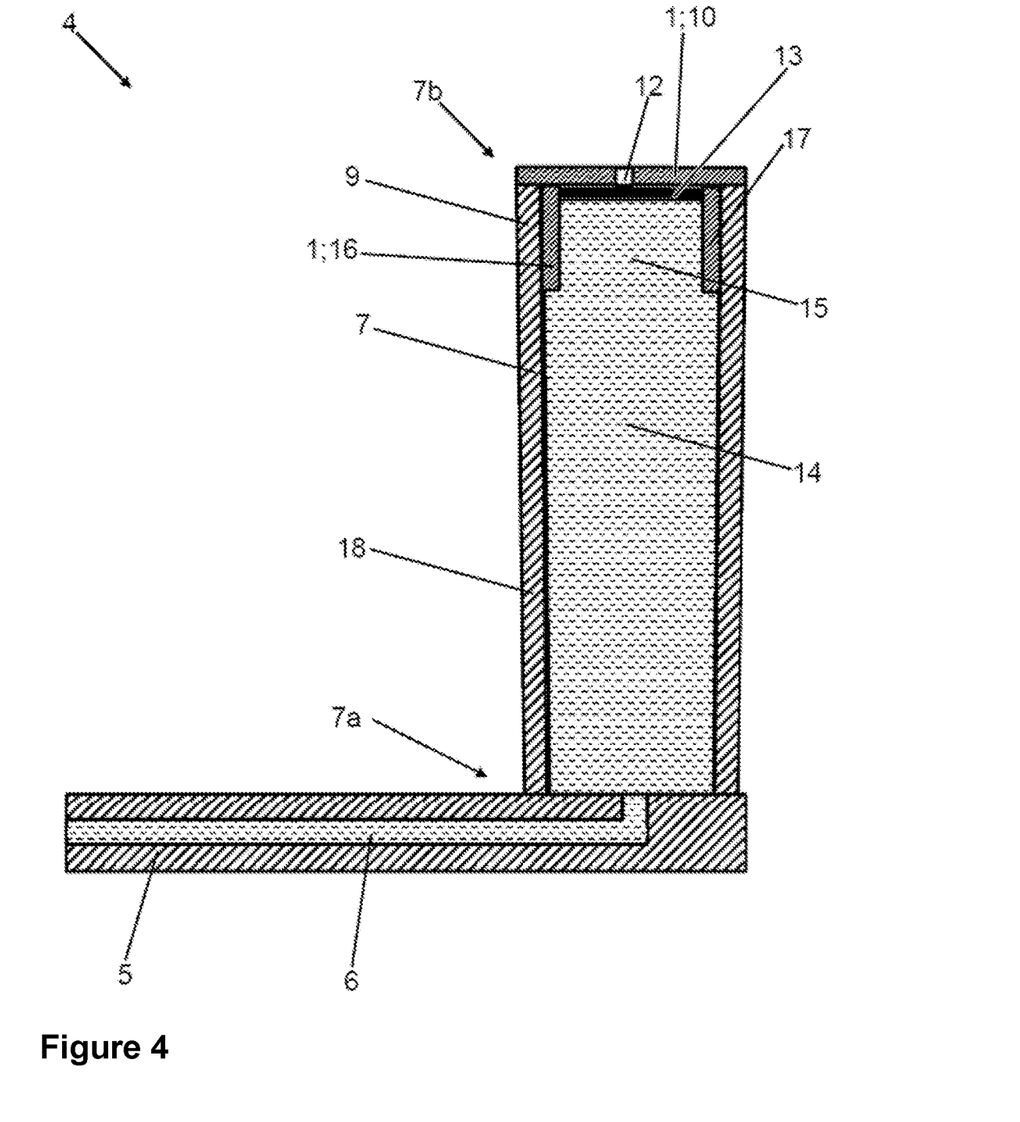
FIG. 4—shows the ingot mold according to FIG. 2 at the end of the casting process.

The metal bath 8 rises to the cover plate 10 during pouring and forms a solidifying ingot 14 with an upper ingot head 15 (FIG. 4). The cover plate 10 isolates the ingot head 15 from the atmosphere and thereby provides for slow cooling of the ingot head 15.

According to a further favorable aspect of the present disclosure, the molded body 1 is used as an insulating plate 16 for a casting hood/insulating hood 17 for thermal insulation of the ingot head 15 from the ingot mold 7, especially from the ingot mold head 9. The ring-shaped insulating hood 17 consists of multiple insulating plates 16 which are connected with one another and which are adjacent to one another in a circumferential direction. It serves as an inner lining of the ingot mold head 9. The insulating hood 17 thus lies on the inside of the ingot mold wall 18. It can also project over the ingot mold 7 on the upper ingot mold end 7b (not shown). In this case it is used particularly together with loose bulk material for insulating the surface 8a of the metal bath 8, which is suctioned away at the end of the casting process.

The insulating hood 17 can also be constructed as a single piece and the molded body 1 is thus used as an insulating hood 17.

The molded body 1 can also advantageously be used as a cover plate for covering/insulating the free surface 8a of the metal bath 8 in a different metallurgical vessel, open at the top. In particular, the molded body 1 can be used as a cover plate 19 for a casting distributor 20 (FIGS. 5 and 6), preferably a continuous casting distributor (tundish).

Figure 5:
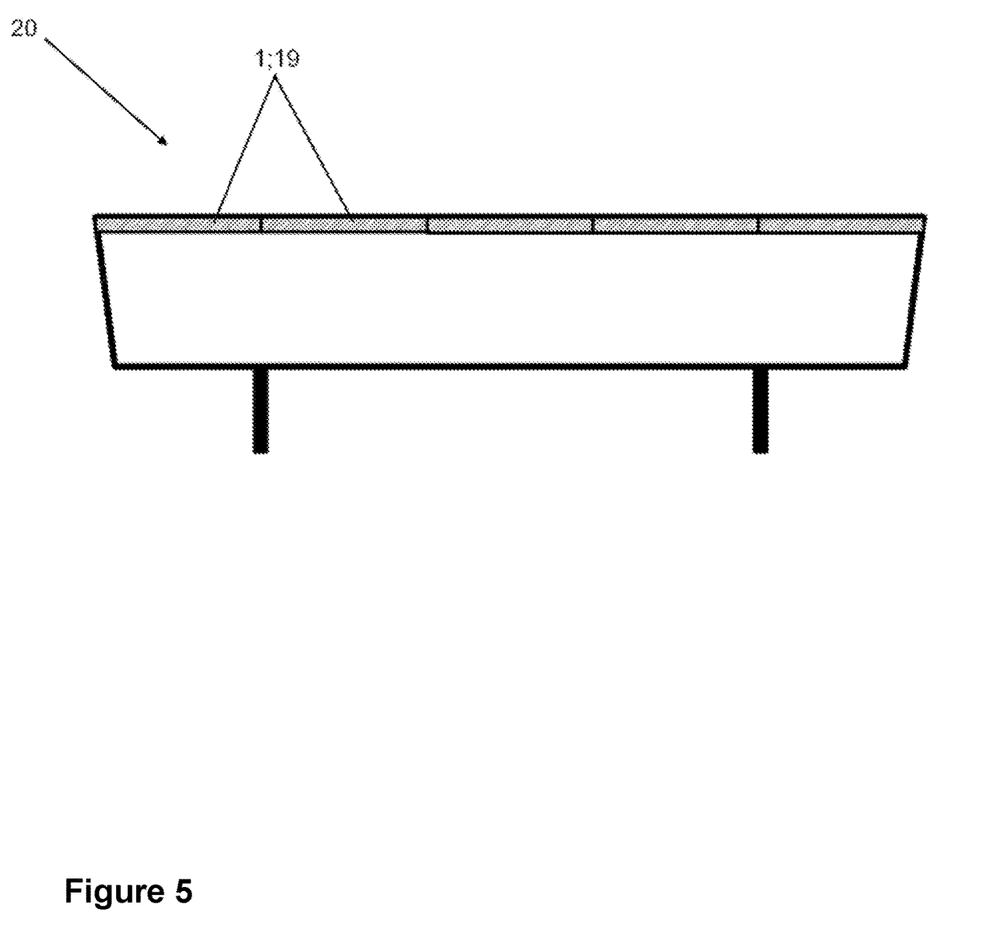
FIG. 5—schematically and in a greatly simplified manner shows a casting distributor before the casting.
Figure 6:
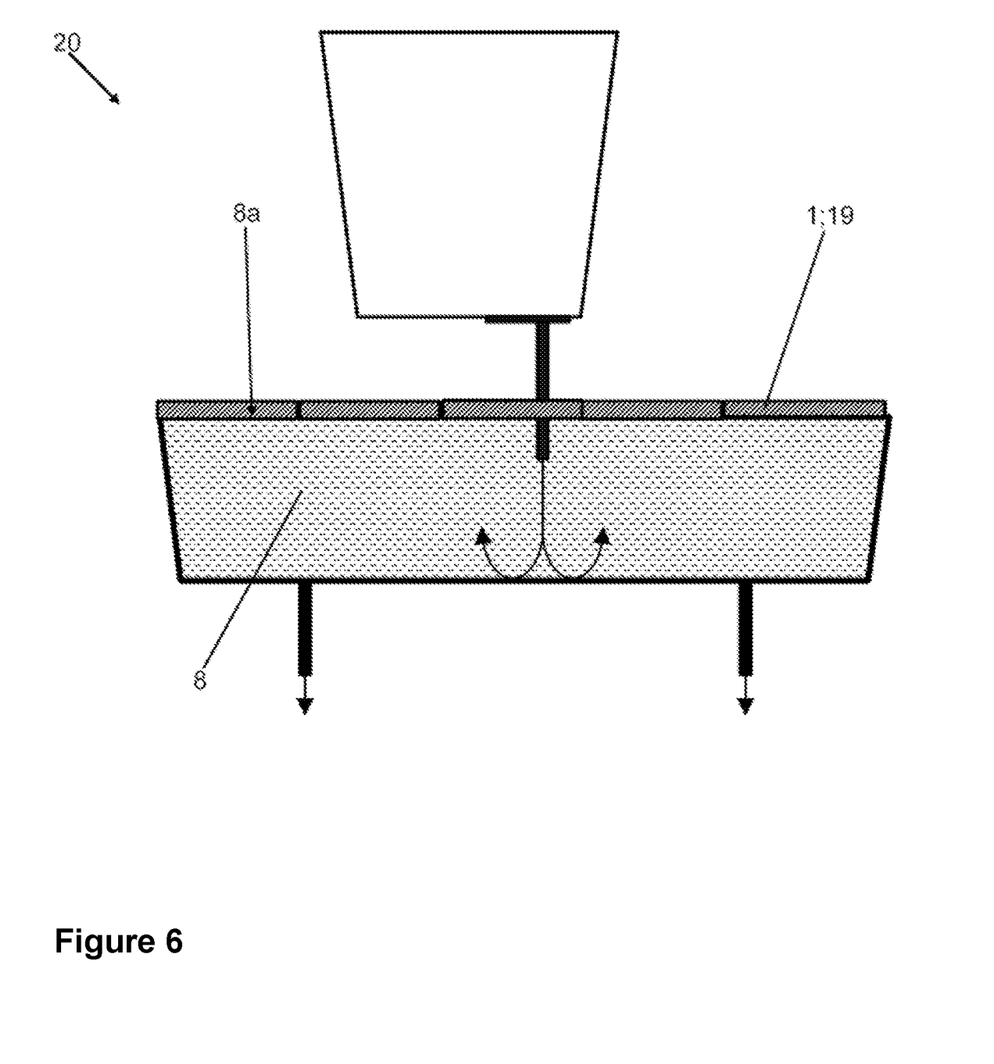
FIG. 6—shows the casting distributor according to FIG. 5 after the casting.

Before casting, the casting distributor 20 is preferably covered with multiple cover plates 19 (FIG. 5). During casting, the metal bath 8 rises to the cover plates 19. These form a continuous insulating cover layer covering the surface 8a of the metal bath 8.

The molded body 1 can also advantageously be used as a cover plate for covering/insulating the exposed surface 8a of the metal bath 8 in a ladle or in troughs.

The molded body 1 can also be placed directly onto the surface 8a of the metal bath 8, so that it floats upon the surface 8a.

Additionally, the molded body 1 can be used as thermal insulation in multi-layer masonry or for refractory linings in heat-treatment furnaces or as a corrosion barrier (for example against alkali attack) or as a fire protection lining or as filter material for hot gases.

The molded body 1 according to the present disclosure comprises low thermal conductivity at low temperatures as well as at high temperatures, and thereby comprises outstanding insulating properties. When used for ingot head insulation in rising ingot casting, this ensures a constantly good ingot head quality. The good thermal insulation results in particular from the very good insulating properties of the biogenic silicic acid and its very high melting point of approximately 1650° C.

Furthermore, the molded body 1 according to the present disclosure is alkali resistant and comprises excellent fire resistance. This results from the combination of alkali-resistant and highly fire-resistant biogenic silicic acid, especially the rice husk ash, with silica sol as a binding agent. This is because the $SiO_2$ bond of the silica gel ensures a high level of alkali resistance and fire resistance of the binding agent matrix.

Furthermore, the molded body 1 is free of pollutants. Additionally, the rice husk ash is a natural recycling product.

By using the cover plate 10 simultaneously as a retaining plate for the casting powder bag 11 and subsequently for insulation of the ingot head 15, an additional step in the process is eliminated. This is because removing the retaining plate and subsequently introducing the loose rice husk ash is not necessary.

Additionally, dust pollution is markedly reduced. Placement of cover plates 10; 19 on the mold 7 or the casting distributor 20 is also markedly easier than applying loose bulk material to the surface 8a of the metal bath 8. Additionally, this can take place before the pouring of the molten metal, which means a markedly lower temperature stress for the respective worker.

In the context of the present disclosure, it is also the case that, during production, the biogenic silicic acid, particularly the rice husk ash, is granulated with water and/or silica sol before mixing with the other components, and the soft or ductile, not-yet-set granulate is mixed with the remaining components. In compaction or pressing, the ductile granules are destroyed, so that the molded body is formed with the aggregate grains from the biogenic silicic acid. An advantage of this variant of the process is that there is less dust produced.

EXAMPLE

A plate according to the present disclosure was produced from a batch with the following composition by uniaxial pressing:

|  | Amount [wt. %] |
| --- | --- |
| liquid SiO₂ binding agent (Köstrosol 2030) | 50 |
| Rice husk ash (NERMAT BF-E) | 50 |

The finished mixture was compacted with a surface weight of 0.5 N/mm². The plate was demolded and dried at 150° C. for 12 hours in a drying oven on a sheet and allowed to set. The plate comprised the following dimensions: 670×670×40 mm³. The plate produced had the following characteristics:

| | |
| --- | --- |
| Dry apparent density $\rho_0$ (DIN EN 1094-4 (09/1995)) | 0.61 g/cm³ |
| Porosity (DIN EN 1094-4 (09/1995)) | 74.65% |
| Cold compression strength (DIN EN 993-5 (12/1998)) | 1.5 N/mm² |
| Cold bending strength (DIN EN 993-6 (04/1995)) | 0.6 N/mm² |

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

While the above description constitutes the preferred embodiments of the present invention, it will be appreciated that the invention is susceptible to modification, variation and change without departing from the proper scope and fair meaning of the accompanying claims.

The invention claimed is:

1. An unfired, refractory molded body comprising a binding agent matrix and an aggregate, the binding agent matrix consisting of silica gel as a binding agent and the aggregate consisting of at least one aggregate material of aggregate grains which grains are incorporated into the binding agent matrix,
   wherein with respect to a total dry mass of the aggregate, the aggregate comprises at least 50 wt. % of biogenic silicic acid as rice husk ash, and 0 to <10 wt. % of at least one additional aggregate material of a refractory material, which is not solely composed of SiO₂, including expanded perlite, expanded vermiculite, expanded clay, inorganic fibers, fly ash, filter dust, or combinations thereof,
   wherein the molded body has a softening point, determined with a heating microscope according to DIN EN 51730:2007-09 of 1500 to 1700° C.

2. The molded body according to claim 1, wherein the aggregate is comprised of at least 80 wt. % of rice husk ash, with respect to the total dry mass of the aggregate.

3. The molded body (1) according to claim 1, wherein the molded body has a dry apparent density $\rho_0$ from 0.3 to 1.5 g/cm³ according to DIN EN 1094-4:1995-09.

4. The molded body (1) according to claim 1, wherein the molded body has a porosity of 60 to 90% according to DIN EN 1094-4:1995-09.

5. The molded body (1) according to claim 1, wherein the molded body has a cold compression strength of 0.5 to 15.0 MPa according to DIN EN 993-5:1998-12.

6. The molded body (1) according to claim 1, wherein the molded body has a cold bending strength of 0.3 to 7.0 MPa according to DIN EN 993-6:1995-04.

7. The molded body (1) according to claim 1, wherein the molded body has a hot bending strength of 0.5 to 5.0 MPa according to DIN EN 993-7:1995-04.

8. The molded body (1) according to claim 1, wherein the molded body has a softening point, determined with a heating microscope according to DIN EN 51730:2007-09 of 1650 to 1700° C.

9. The molded body (1) according to claim 1, wherein the molded body has the following thermal conductivities according to DIN EN 993-15:2005-07:

| | Thermal Conductivity [W/mK] |
| --- | --- |
| At 26° C. | 0.10 to 0.14 |
| | 0.12 to 0.16 |
| | 0.17 to 0.21 |
| | 0.25 to 0.29 |
| At 307° C. | |
| At 700° C. | |
| At 995° C. | |

10. The molded body according to claim 1, wherein the molded body is a plate.

11. The molded body according to claim 1, wherein the molded body comprises at least one additional aggregate material, consisting of SiO₂ in a form of microsilica and/or pyrogenic silica and/or precipitated silica.

12. The molded body according to claim 2, wherein the aggregate of the molded body is comprised of at least 90 wt. % of rice husk ash, with respect to the total dry mass of the aggregate.

13. The molded body according to claim 2, wherein the aggregate of the molded body is comprised 100 wt. % of rice husk ash, with respect to the total dry mass of the aggregate.

14. The molded body according to claim 3, wherein the molded body has a dry apparent density $\rho 0$ from 0.5 to 1.3 g/cm³ according to DIN EN 1094-4:1995-09.

15. The molded body according to claim 4, wherein the molded body has a porosity from 70 to 80% according to DIN EN 1094-4:1995-09.

16. The molded body according to claim 5, wherein the molded body has a cold compression strength of 1.0 to 10.0 MPa according to DIN EN 993-5:1998-12.

17. The molded body according to claim 6, wherein the molded body has a cold bending strength of 0.5 to 5.0 MPa according to DIN EN 993-6:1995-04.

18. The molded body according to claim 7, wherein the molded body has a hot bending strength of 1.0 to 3.0 MPa according to DIN EN 993-7:1995-04.

19. A process for producing a molded body according to claim 1, characterized by the following steps:
   a) Producing a mixture comprising aggregate and silica sol,
   b) Filling the mixture into a mold,
   c) Compacting of the mixture to form a green body, d) Demolding the green molded body, and
e) Allowing the molded body to set.

20. The process according to claim 19, wherein the composition of the mixture is adjusted such that the mixture has a slump—determined in reference to DIN EN ISO 1927-4:2013-03—of 200 to 500 mm.

\* \* \* \* \*

UNITED STATES PATENT AND TRADEMARK OFFICE
CERTIFICATE OF CORRECTION

PATENT NO. : 11,148,973 B2
APPLICATION NO. : 16/313629
DATED : October 19, 2021
INVENTOR(S) : Helge Jansen et al.

It is certified that error appears in the above-identified patent and that said Letters Patent is hereby corrected as shown below:

In the Specification

In Column 5, Line 17, insert the phrase --after 30 seconds under vibration-- between the phrases "adjusted so that" and "the mixture".

In the Claims

In Column 11, Line 4, insert the phrase --after 30 seconds under vibration-- between the phrases "adjusted such that" and "the mixture".

Signed and Sealed this
First Day of March, 2022

Drew Hirshfeld
*Performing the Functions and Duties of the
Under Secretary of Commerce for Intellectual Property and
Director of the United States Patent and Trademark Office*